US010563400B2

(12) United States Patent
Graham et al.

(10) Patent No.: US 10,563,400 B2
(45) Date of Patent: Feb. 18, 2020

(54) PREFABRICATED STRUCTURAL BUILDING PANEL (71) Applicants: Rickey Graham, Weston (CA); Nickolas Graham, Weston (CA)

(72) Inventors: Rickey Graham, Weston (CA); Nickolas Graham, Weston (CA)

(*) Notice: Subject to any disclaimer, the term of this patent is extended or adjusted under 35 U.S.C. 154(b) by 0 days.

(21) Appl. No.: 15/494,024

(22) Filed: Apr. 21, 2017

(65) Prior Publication Data
US 2017/0306624 A1    Oct. 26, 2017

Related U.S. Application Data (60) Provisional application No. 62/326,302, filed on Apr. 22, 2016.

(30) Foreign Application Priority Data

Aug. 1, 2016 (CA) ..................... 2937630

(51) Int. Cl.
E04C 2/292    (2006.01)
E04C 2/36     (2006.01)
(Continued)

(52) U.S. Cl.
CPC .............. E04C 2/292 (2013.01); B32B 3/02 (2013.01); B32B 3/06 (2013.01); B32B 3/08 (2013.01); B32B 3/20 (2013.01); B32B 3/28 (2013.01); B32B 5/145 (2013.01); B32B 5/18 (2013.01); B32B 5/32 (2013.01); B32B 13/06 (2013.01);
(Continued)

(58) Field of Classification Search
CPC ........ E04C 2/3405; E04C 2/292; E04C 2/296; E04C 2002/3444; E04C 2002/3455; E04C 2/322; E04C 2/34; B32B 3/28
See application file for complete search history.

(56) References Cited

U.S. PATENT DOCUMENTS 2,034,489 A    3/1936  Scherer
3,206,902 A *  9/1965  Bertolini .............. B62D 33/048
                                                    52/582.1
(Continued)

FOREIGN PATENT DOCUMENTS

CA    2254497       6/1999
EP    2644797       10/2013
WO    2013/067614   5/2013

OTHER PUBLICATIONS

AIBTI Affordable Innovative Building Technologies, Inc., Patented Pre-Engineered Interlock Insulated Structural Steel Panel Building System, Brochure, circa Aug. 2010.

Primary Examiner — Jessie T Fonseca
(74) Attorney, Agent, or Firm — Bereskin & Parr (57) ABSTRACT A load bearing building panel having a first sheet intended to provide an inner building surface, a second sheet intended to provide an outer building surface, and an insulating foam core sandwiched between them. The sheet that provides the inner building surface is corrugated to define co-planar portions separated by a plurality of channels which are dimensioned so as to be able to accommodate standard size electrical boxes and/or plumbing pipes. Advantageously, the other sheet is also corrugated to define a plurality of channels so that a plurality of panels can be stacked in a partially nesting relationship.

16 Claims, 10 Drawing Sheets (51) Int. Cl.
*B32B 3/20* (2006.01)
*E04C 2/38* (2006.01)
*B32B 13/06* (2006.01)
*B32B 3/06* (2006.01)
*B32B 5/32* (2006.01)
*B32B 15/04* (2006.01)
*B32B 3/08* (2006.01)
*B32B 3/02* (2006.01)
*B32B 5/14* (2006.01)
*B32B 15/18* (2006.01)
*B32B 3/28* (2006.01)
*B32B 5/18* (2006.01)
*E04C 2/284* (2006.01)
*E04C 2/32* (2006.01)
*E04C 2/34* (2006.01)
*E04C 2/52* (2006.01)
*E04C 2/00* (2006.01)

(52) U.S. Cl.
CPC .......... *B32B 15/046* (2013.01); *B32B 15/18* (2013.01); *E04C 2/284* (2013.01); *E04C 2/322* (2013.01); *E04C 2/34* (2013.01); *E04C 2/36* (2013.01); *E04C 2/38* (2013.01); *E04C 2/384* (2013.01); *E04C 2/521* (2013.01); *B32B 2250/03* (2013.01); *B32B 2250/04* (2013.01); *B32B 2250/05* (2013.01); *B32B 2250/40* (2013.01); *B32B 2255/06* (2013.01); *B32B 2255/205* (2013.01); *B32B 2266/02* (2013.01); *B32B 2266/0214* (2013.01); *B32B 2266/0278* (2013.01); *B32B 2305/022* (2013.01); *B32B 2307/304* (2013.01); *B32B 2307/50* (2013.01); *B32B 2307/732* (2013.01); *B32B 2419/00* (2013.01); *B32B 2607/00* (2013.01); *E04C 2002/001* (2013.01)

(56) References Cited

U.S. PATENT DOCUMENTS

| | | | |
|---|---|---|---|
| 3,367,076 A * | 2/1968 | O'Brien | E04C 2/296 52/309.11 |
| 3,397,496 A | 8/1968 | Sohns | |
| 3,469,873 A | 9/1969 | Glaros | |
| 3,535,844 A | 10/1970 | Glaros | |
| 4,143,498 A | 3/1979 | Martin | |
| 4,283,897 A | 8/1981 | Thompson | |
| 4,546,590 A | 10/1985 | Finch et al. | |
| 4,575,981 A | 3/1986 | Porter | |
| 4,790,112 A | 12/1988 | Wang | |
| 4,837,999 A * | 6/1989 | Stayner | E04B 7/22 52/309.11 |
| 5,228,257 A | 7/1993 | Bowersox et al. | |
| 5,373,678 A | 12/1994 | Hesser | |
| 5,673,524 A * | 10/1997 | Gailey | B32B 3/06 52/309.11 |
| 6,085,485 A | 7/2000 | Murdock | |
| 6,233,892 B1 * | 5/2001 | Tylman | E04B 7/22 52/309.12 |
| 6,260,323 B1 | 7/2001 | Hockey | |
| 6,799,403 B2 | 10/2004 | Winter | |
| 7,926,233 B2 | 4/2011 | Schiffman et al. | |
| 8,635,828 B2 * | 1/2014 | Bahnmiller | B32L 35/14 52/309.4 |
| 9,249,572 B2 * | 2/2016 | Neumayr | E04C 2/3405 |
| 2002/0144484 A1 | 10/2002 | Vrana | |
| 2003/0033769 A1 | 2/2003 | Record | |
| 2012/0085062 A1 | 4/2012 | Neumayr | |
| 2012/0231231 A1 * | 9/2012 | Curtin | E04C 2/292 428/192 |
| 2013/0067758 A1 | 3/2013 | Fearon et al. | |

\* cited by examiner

PREFABRICATED STRUCTURAL BUILDING PANEL

RELATED PATENT APPLICATIONS

The present application claims priority from U.S. provisional patent application No. 62/326,302 filed on Apr. 22, 2016, and from Canadian patent application no. 2,937,630 filed Aug. 1, 2016, both entitled Prefabricated Structural Building Panel, the disclosures of which are hereby incorporated by reference in their entirety.

FIELD

The present subject matter relates to prefabricated building panels.

BACKGROUND

Prefabricated modular building panels are well known. In some versions they include a pair of metal sheets with an insulating polymer foam core sandwiched between the sheets. Various panels of this type have been used for cladding material on buildings having a conventional load bearing frame structure.

U.S. Pat. No. 6,085,485 discloses a modified version of such a building panel that is itself made load bearing through the inclusion of a central rib member that connects between the two metallic sheets extending the length of the panel. This feature obviates the need for a conventional frame structure.

The building panel disclosed in U.S. Pat. No. 6,085,485, however, has a number of disadvantages. For one thing, no accommodation is made for plumbing or electrical components; recesses must be cut into the interior side of the building panel to accommodate such components.

Another disadvantage is that the central location of the structural rib interferes with easy, efficient and uniform spray application of the insulating foam.

A further disadvantage relates to the overall dimension of the building panel, which does not correspond to standard dimensions for installation of interior finishing materials such as drywall.

Yet another disadvantage relates to the means for fixing the panels to a base such as a floor or pad in a manner that avoids stresses that can tend to separate the outer sheets from the interior foam.

In addition, the building panels disclosed in U.S. Pat. No. 6,085,485 readily slide upon each other when they are stacked, which can lead to difficulties in their handling and the quality of their delivery to building sites.

SUMMARY

The following summary is intended to introduce the reader to the more detailed description that follows, and not to define or limit the claimed subject matter.

According to one aspect, the present subject matter comprises a building panel having a first sheet intended to provide an inner building surface, a second sheet arranged generally parallel to the first sheet and intended to provide an outer building surface, and an insulating foam core sandwiched between the first and second sheets. Advantageously, the sheets are both generally rectangular. The distance between the first and second sheets defines the thickness of the panel, while the longer dimension of the sheets defines the length of the panel and the shorter dimension defines the width of the panel. The first sheet is corrugated to define co-planar portions separated by a plurality of generally parallel channels that extend along the length of the panel. The channels are dimensioned so as to be able to fully accommodate standard size electrical boxes and/or plumbing pipes.

Advantageously, the channels define intermediate ledges at a depth able to accommodate within the channel one group of standard-sized electrical boxes, and the channels also define a bottom at a depth to accommodate within the channel a second group of standard-sized electrical boxes. Advantageously, the depth of the ledges is about 1½ inches, while the depth of the channel bottom is just over 2 inches.

Advantageously, the second sheet is also corrugated, defining a plurality of channels that are dimensioned and spaced to align with and receive the co-planar portions of the first sheet so that a plurality of panels can be stacked in a partially nesting relationship.

According to a second aspect, the present subject matter provides a load bearing building panel having a first sheet intended to provide an inner building surface, a second sheet arranged generally parallel to the first sheet and intended to provide an outer building surface, and an insulating foam core sandwiched between the first and second sheets. Advantageously, the sheets are generally rectangular. The distance between the first and second sheets defines the thickness of the panel, while the longer dimension of surface of each of the sheets defines the length of the panel and the shorter dimension defines the width of the panel. The edges of the panel are defined by the surfaces between the sheets running the length of the panel, and the ends of the panel are defined by the surfaces between the sheets running the width of the panel. The first sheet is corrugated to define a plurality of generally parallel channels that extend along the length of the panel. The panel further includes a rib connected between the first and second sheets extending along one edge of the panel.

Advantageously, the rib is fastened to each of the first and second sheets with insulating foam therebetween to provide a thermal break.

According to another aspect, the present subject matter provides a building panel having a first sheet intended to provide an inner building surface, a second sheet arranged generally parallel to the first sheet and intended to provide an outer building surface, and an insulating foam core sandwiched between the first and second sheets. Advantageously, the sheets are generally rectangular. The distance between the first and second sheets defines the thickness of the panel, while the longer dimension of surface of each of the sheets defines the length of the panel and the shorter dimension defines the width of the panel. The edges of the panel are defined by the surfaces between the sheets running the length of the panel, and the ends of the panel are defined by the surfaces between the sheets running the width of the panel. The first sheet is corrugated to define a plurality of generally parallel channels that extend along the length of the panel. The panel has mating left and right edges such that a plurality of abutting panels can be inserted and locked together. The panels are dimensioned such that a plurality of panels defines a nominal width corresponding to standard building materials such as sheets of drywall.

Advantageously, the panels have a nominal width of 2 feet.

According to another aspect, the present subject matter provides a building panel system. The system comprises a building panel having a first sheet intended to provide an inner building surface, a second sheet arranged generally parallel to the first sheet and intended to provide an outer building surface, and an insulating foam core sandwiched between the first and second sheets. Advantageously, the sheets are generally rectangular. The distance between the first and second sheets defines the thickness of the panel, while the longer dimension of surface of each of the sheets defines the length of the panel and the shorter dimension defines the width of the panel. The edges of the panel are defined by the surfaces between the sheets running the length of the panel, and the ends of the panel are defined by the surfaces between the sheets running the width of the panel. The first sheet is corrugated to define a plurality of generally parallel channels that extend along the length of the panel. The system also includes a U-shaped base member that is used to secure a plurality of abutting building panels to a base such as a foundation or a raised platform. The U-shaped base member has a pair of flanges extending up from a connecting web. The U-shaped base member is dimensioned such that it can fit within a building panel at an end thereof such that the flanges of the U-shaped base member are enclosed in proximity with the interior surfaces of the first and second sheets.

Advantageously, the ends of the building panel are pre-cut to provide a groove to accommodate the flanges of the U-shaped base member.

BRIEF DESCRIPTION OF THE DRAWINGS

In order that the claimed subject matter may be more fully understood, reference will be made to the accompanying drawings, in which:

DETAILED DESCRIPTION OF EMBODIMENTS

In the following description, specific details are set out to provide examples of the claimed subject matter. However, the embodiments described below are not intended to define or limit the claimed subject matter. It will be apparent to those skilled in the art that many variations of the specific embodiments may be possible within the scope of the claimed subject matter.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Figure 1:
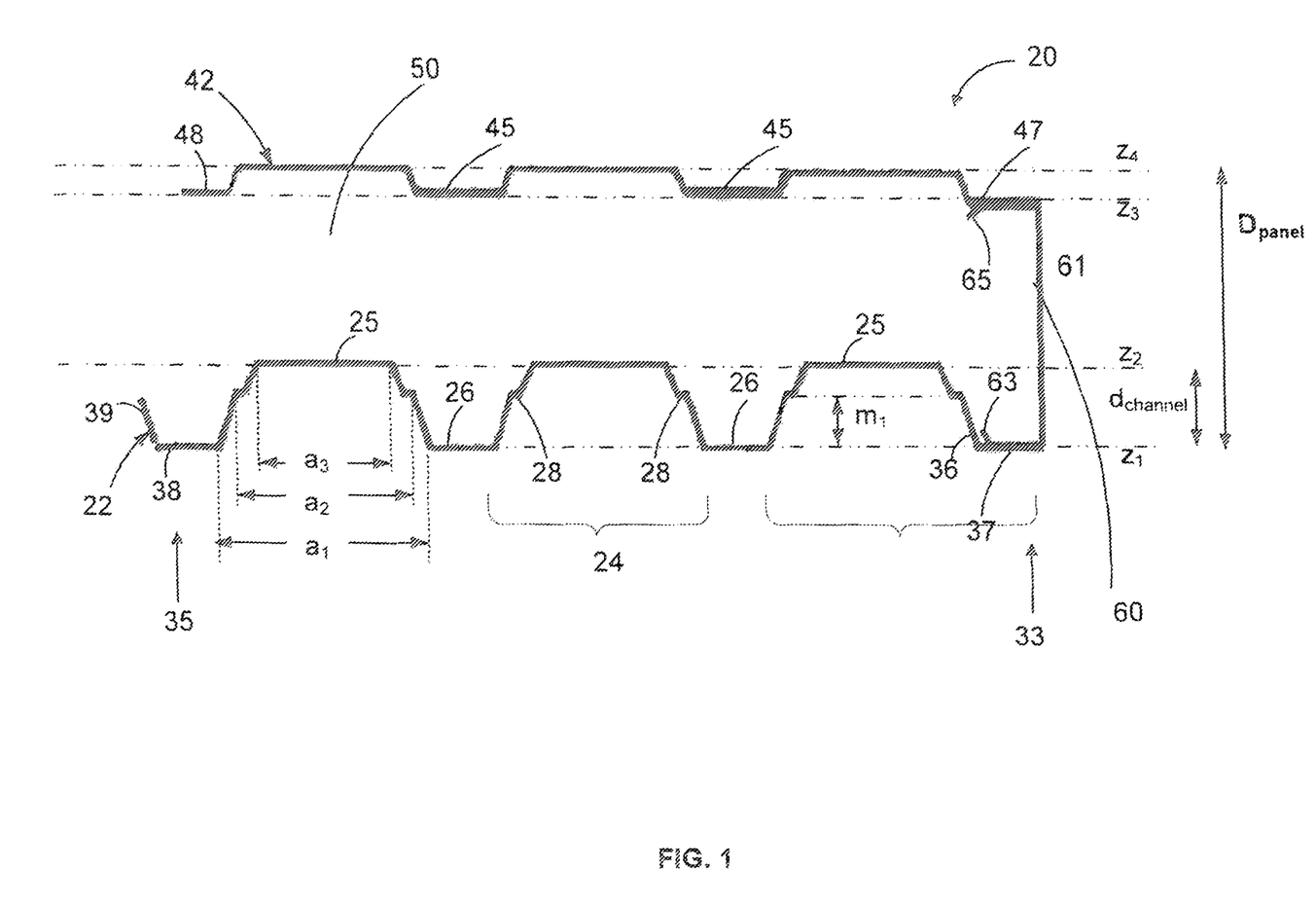
FIG. 1 shows a schematic bottom perspective view of a building panel, in accordance with at least one embodiment.

Referring now to FIG. 1, shown therein is a schematic top view of a building panel 20, in accordance with at least one embodiment. The building panel 20 comprises a first sheet 22 and a second sheet 42. The first sheet 22 is intended to provide the inner surface of a building. The second sheet 42 is intended to provide an outer surface of the building. Both sheets are generally rectangular, but with corrugations. An insulating foam core 50 is sandwiched between the first sheet 22 and the second sheet 42.

Figure 2:
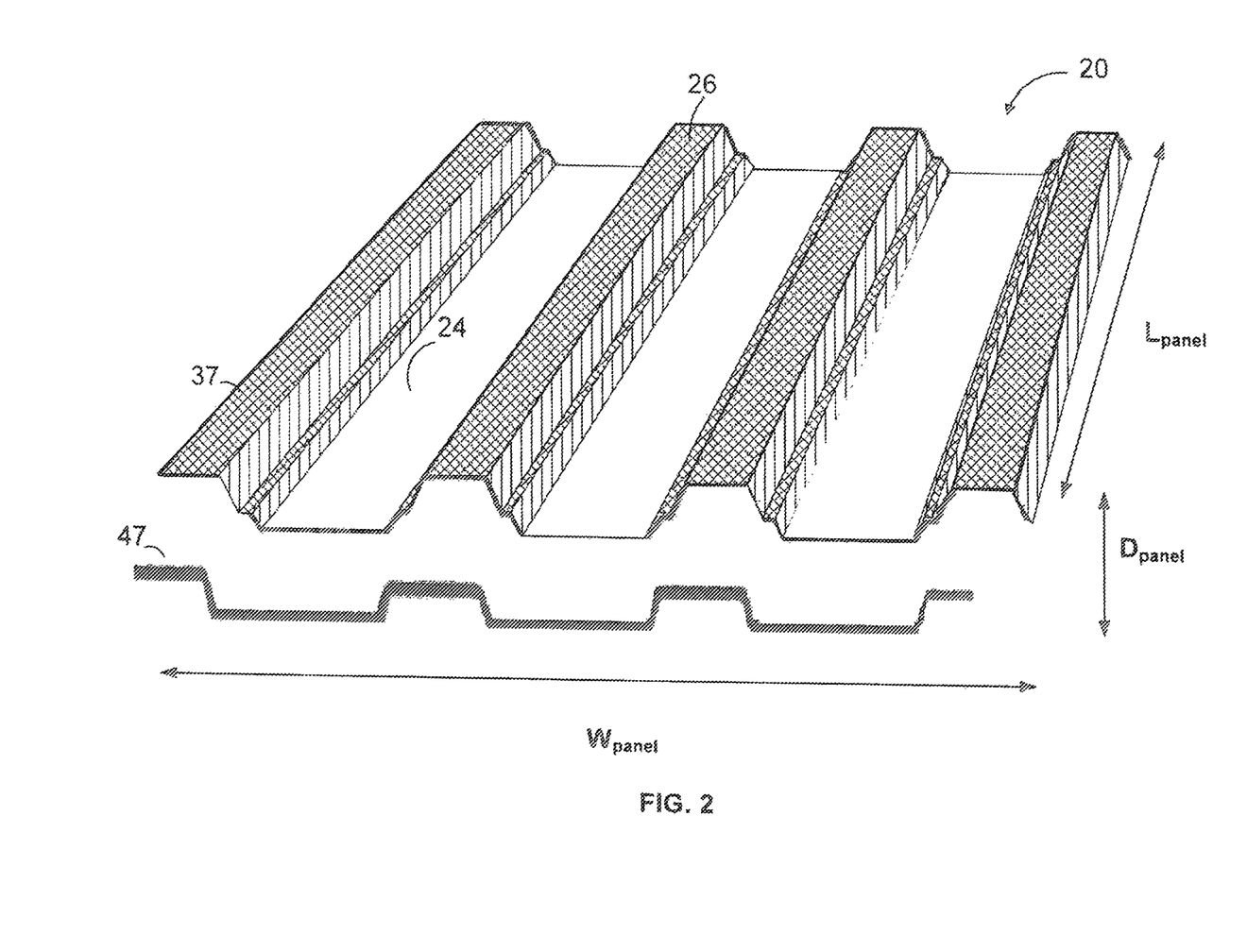
FIG. 2 shows a perspective view of the building panel, in accordance with at least one embodiment.

FIG. 2 shows a perspective view of the building panel 20. The longest outer dimension of the first and the second sheets 22, 42 defines the length L of the panel 20. The shorter dimension of the sheets 22, 42 defines the width W of the panel.

The panel 20 can be dimensioned such that a plurality of panels 20 defines a nominal width W corresponding to standard building materials such as sheets of drywall. For example, the panels 20 may have a nominal width of 2 feet, such that a pair of contiguous panels defines a nominal width of 4 feet (which is a standard size for drywall).

Referring to FIG. 1 and FIG. 2, the first sheet 22 is corrugated to define a plurality of generally parallel channels 24 and ridges 26 that extend along the length L of the panel 20.

The external surfaces 37 of the ridges 26 may be positioned on the outer plane Z1 of the first sheet 22. For example, sheets of drywall may be installed in plane Z1 so that the external surfaces 37 touch the drywall. The internal surfaces 25 of the channels 24 may be positioned on the inner plane Z2 of the first sheet 22.

In at least one embodiment, each of the channels 24 defines intermediate ledges 28 at a depth $m_1$ from the external surface 37. For example, there may be more than one ledge 28 on each side of the channel 24. For example, the depth $d_{channel}$ of the channel of the first sheet 22 may be about 2 inches. For example, the depth $m_1$ of the intermediate ledges 28 may be about 1½/inch.

Figure 5:
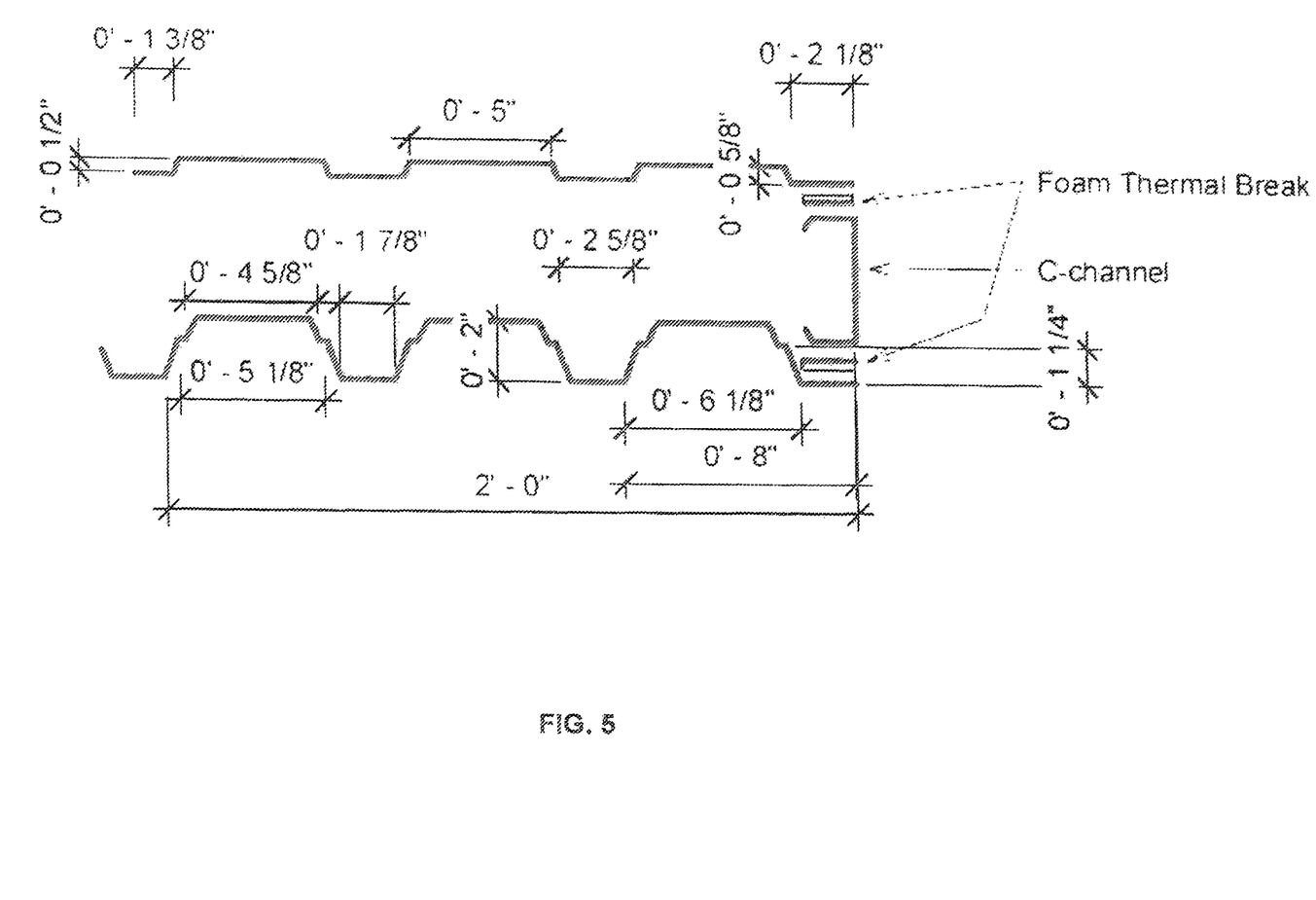
FIG. 5 schematically shows examples of the dimensions of the building panel, in accordance with at least one embodiment.

Examples of the dimensions of the panel 20 are schematically shown at FIG. 5.

In at least one embodiment, the intermediate ledges 28 may provide additional rigidity to the first sheet 22. The ledges 28 can be used to accommodate the electrical boxes as described herein. The electrical boxes may abut to the sides of the channel 24 and to the ledges 28.

Referring now to FIGS. 1-5, each channel 24 may have the outer width a defined by the adjacent ridges 26, an intermediate width $a_2$ defined by the intermediate ledges 28, and a bottom width $a_3$. For example, the outer width $a_1$ may be 0 to about 6⅛, the intermediate width $a_2$ may be 0 to about 5⅛ inch, and the width of the bottom of the channel $a_3$ may be 0 to about 4⅝ inch.

The channels 24 are dimensioned so as to be able to fully accommodate different types of standard size electrical boxes and/or plumbing pipe.

Figure 3:
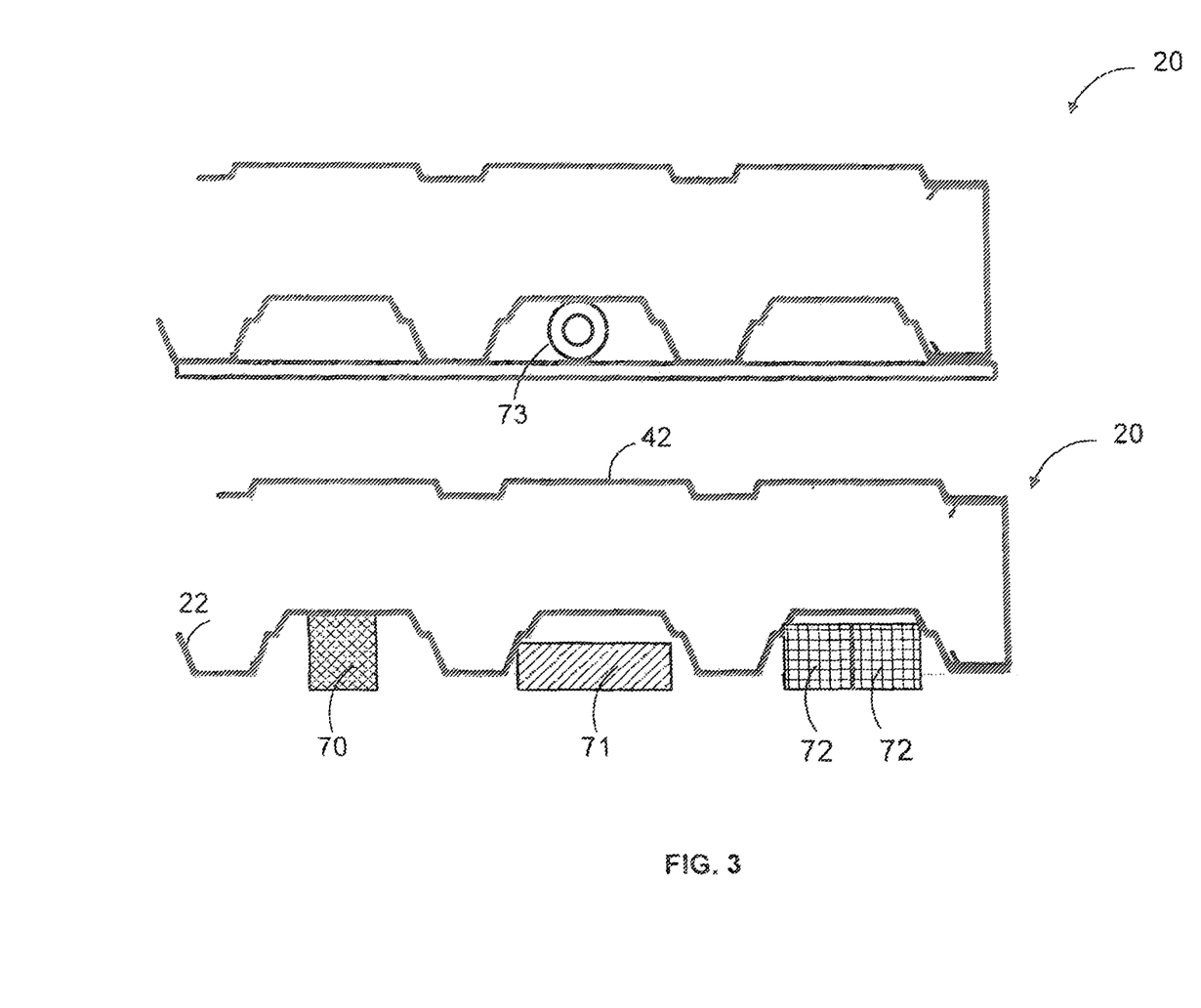
FIG. 3 shows a top view of two building panels accommodating electrical boxes and a plumbing drain pipe, in accordance with at least one embodiment.

FIG. 3 shows a top view of two panels 20 accommodating electrical boxes and a plumbing drain pipe in accordance with at least one embodiment.

For example, a first type standard electrical box 70 may have a first smaller depth, and the channels also define a bottom dimensioned to accommodate a second standard electrical box having a deeper depth.

For example, the first type standard size electrical box 70 may have dimensions of about 3 inches by about 2 inches by about 2½ inches. For example, the second type standard size electrical box 71 may have dimensions of about 4¹¹⁄₁₆ by about 1½ inches. For example, the channel 24 may accommodate two of the third type standard size electrical box(es)

72 with dimensions of about 3 inches by 2 inches by 2 inches. In another example shown at FIG. 3, the channel 24 may accommodate one second type standard size electrical box 71.

The channel 24 may accommodate plumbing pipe 73 with a diameter of ⅜"-1½" inches.

For example, the first sheet 22 can have three channels 24 and four ridges 26.

The widest distance $D_{panel}$ between the first sheet 22 and the second sheet 42 defines the thickness of the panel 20, as shown at FIG. 1.

In at least one embodiment, the second sheet 42 is also corrugated. The second sheet may define a plurality of mating valleys 45 that are dimensioned and spaced to align with and receive the co-planar portions of the first sheet 22 so that a plurality of panels 20 can be stacked in a partially nesting relationship.

For example, the width of the second sheet valleys 45 may be 0 inches to about 5 inches. The depth of the second sheet valleys 45 may be 0 to about ½ inches. For example, the depth of the second sheet edge channel 47 that is close to the end portion of the second sheet may be 0 to about ⅝ inches.

Figure 4:
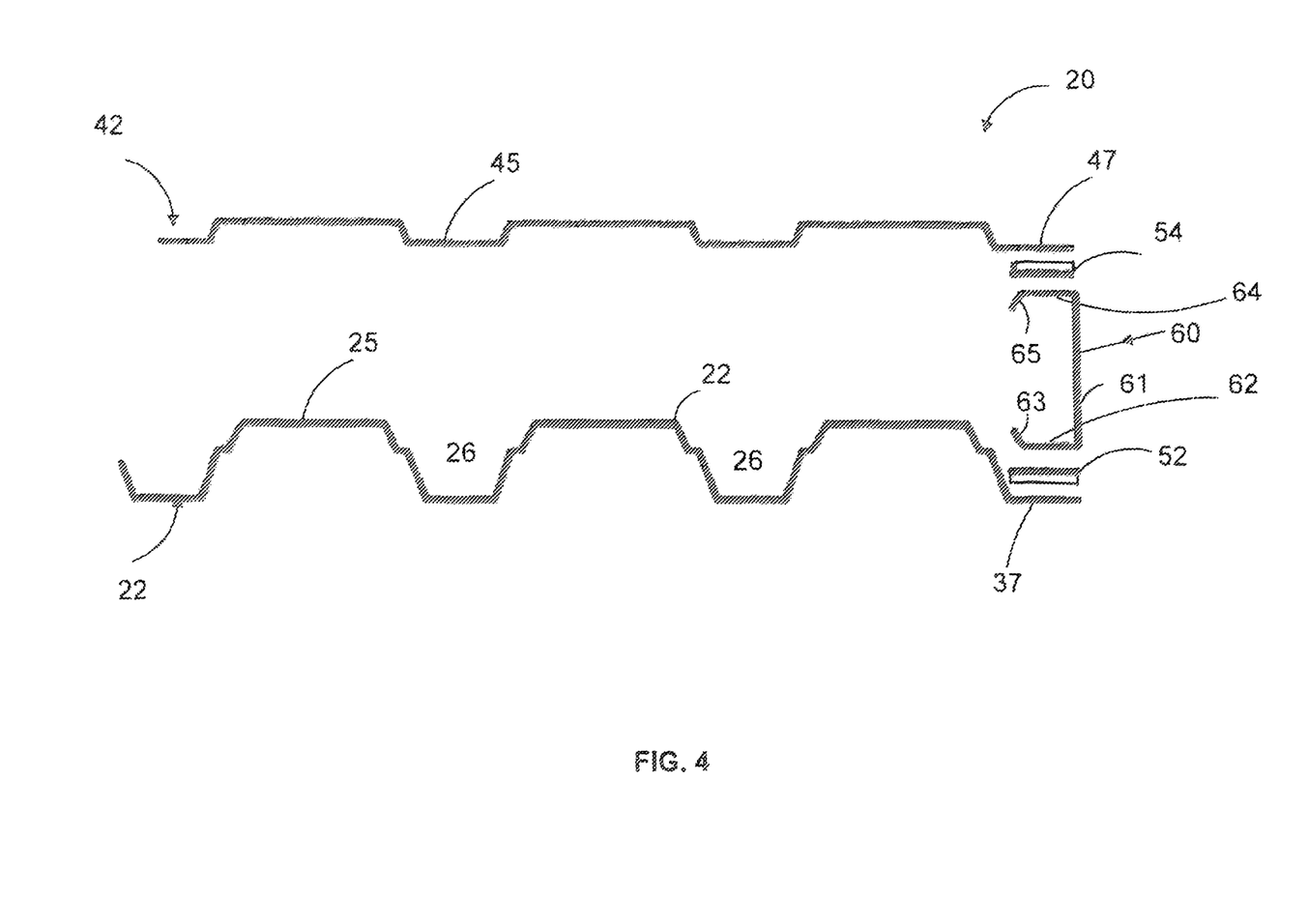
FIG. 4 shows a schematic exploded view of the building panel, in accordance with at least one embodiment.

Referring now to FIGS. 4 and 5, shown therein is a schematic exploded view of the building panel 20 in accordance with at least one embodiment.

In at least one embodiment, the building panel 20 may also comprise a C-shaped rib 60 connected between the edge portion 37 of the first sheet 22 and the edge portion 47 of the second sheet 42. The C-shaped rib 60 may extend along one edge of the panel 20. The edges 37 and 47 of the first and second panels 22, 42 may be defined by the surfaces between the sheets running the length of the panel.

In at least one embodiment, the C-shaped rib 60 may comprise a transverse portion 61 and first and second fastening portions 62 and 64 that are connected and fastened to both sides of the transverse portion 61. Flanges 63 and 65 of the C-shaped rib 60 extend from the first and second fastening portions 62 and 64. For example, the first and the second fastening portions 62 and 64 may be generally parallel to each other.

The C-shaped rib 60 may be fastened to each of the first and second sheets 22, 42 with insulating foam sheets 52, 54 positioned in between of edge portions 37, 47 of the sheets and respective fastening portions 62, 64 of the C-shaped rib 60. The insulating foam sheets 52, 54 may thus provide a thermal break.

In at least one embodiment, the width of the C-shaped rib 60 is about the width of the edge portions 37 and 47 of the first and the second sheets 22, 42. For example, the length of the first and second fastening portions 62 and 64 may be approximately the same or less than the length of the edge portions 37 and 47.

In at least one embodiment, the C-shaped rib 60 provides load-bearing functions to the panel. When the panel 20 is installed, the C-shaped rib 60 runs from the top to the bottom of the panel 20.

Load bearing capability will be determined by an engineer to meet all building codes. The gauge and size of the C-shaped rib 60 can be adjusted to meet strength requirements as required.

The width of the transverse portion 61 defines the thickness of the panel $D_{panel}$. The wider the panel, the wider can be the insulating foam core 50 and the R-value may be increased. For example, the R-value of the insulation may be 7.4 per inch, so a 3" panel would be R22.2 and a 6" panel would be R44.4

Figure 6:
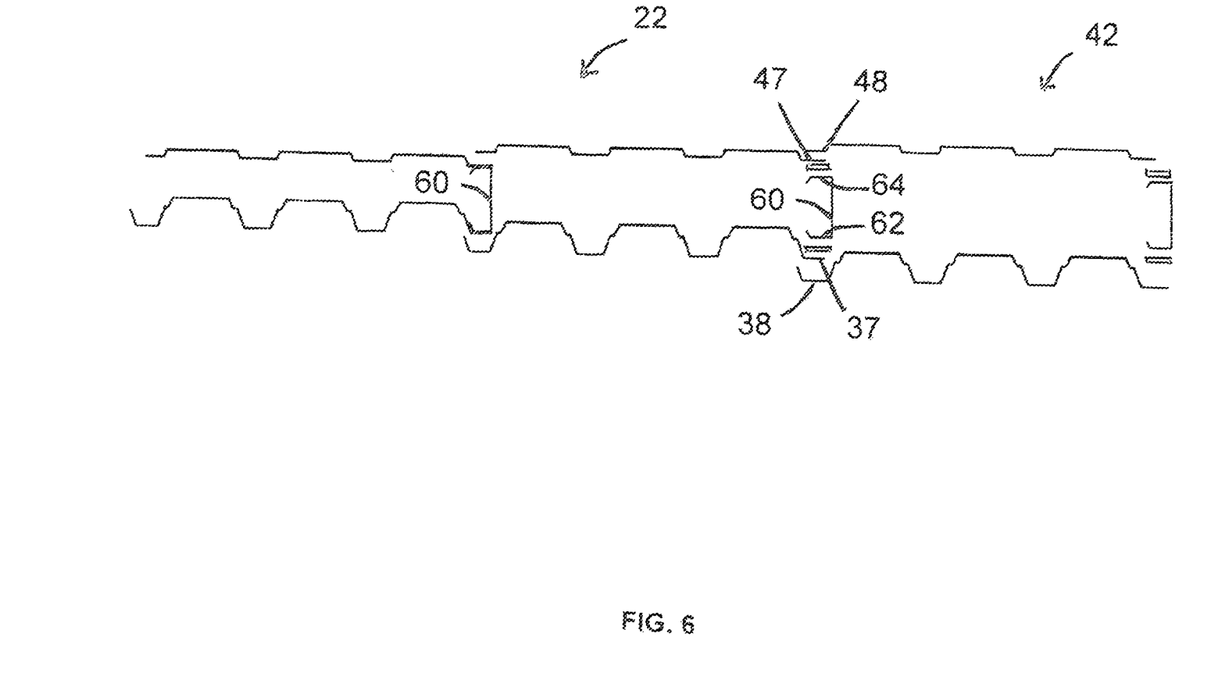
FIG. 6 shows fastening of the building panels to the C-shaped rib, in accordance with at least one embodiment.

FIG. 6 shows fastening of the panels 22 and 42 to the C-shaped ribs 60 in accordance with at least one embodiment. Various types of fasteners may be used. For example, screws, rivets, or other suitable fasteners may be used. As the first and the second fastening portions 62 and 64 of the C-shaped rib 60 have the same length as the edge portions 37 and 47, the whole length of the edge portions 37 and 47 may be used to fasten the edge portions 37 and 47 to the C-shaped rib 60. In this case, when fastening the sheets 22 and 42 to the C-shaped rib 60, the position of the fastener may be anywhere on the edge portions 37 and 47.

The edges of the panels 20 are defined by the surfaces between the sheets running the length of the panel, and the ends of the panel are defined by the surfaces between the sheets running the width of the panel In at least one embodiment, the first sheet 22 has a male edge, having an edge portion 37, and a female edge, having an edge portion 38 and an edge flange 39. The second sheet 42 has a male edge 47, and a female edge 48, such that a plurality of abutting panels can be inserted and locked together.

Figure 7A:
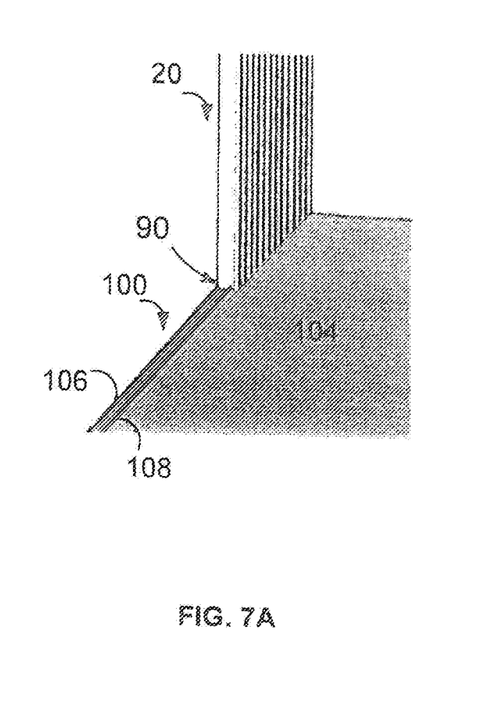
FIGS. 7A, 7B, and 7C show a U-shaped base member in a perspective view, top view and a side view, respectively, in accordance with at least one embodiment.
Figure 7B:
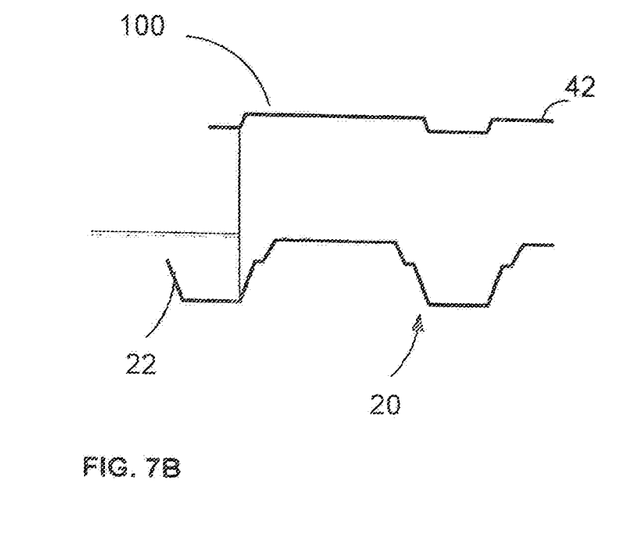
Figure 7C:
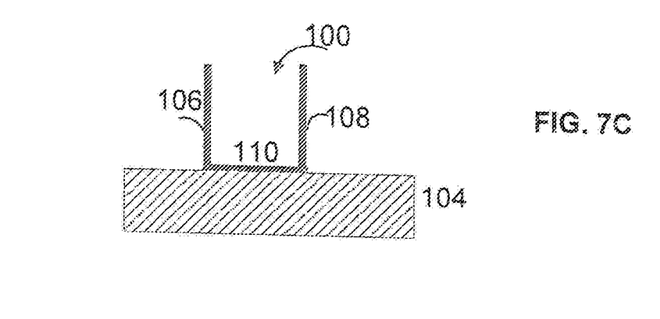

Referring now to FIGS. 7A, 7B, and 7C, shown therein is a U-shaped base member 100 in a perspective view, top view and a side view, respectively in accordance with at least one embodiment. The U-shaped base member 100 may have a pair of base flanges 106, 108 extending up from a connecting web 110. The U-shaped base member 100 can be used to secure a plurality of abutting building panels 20 to a base 104.

For example, the base 104 may be a foundation or a raised platform. The U-shaped base member 100 may be first secured to the base 104. The panel 20 may then be mounted and fastened both to the side wall 108 of the U-shaped base member 100.

In at least one embodiment, the U-shaped base member 100 may be dimensioned such that it can fit within the panel 20 at a panel end 90, such that the base flanges 106, 108 of the U-shaped base member 100 may be enclosed in proximity with the interior surfaces of the first and second sheets 22 and 42.

In at least one embodiment, the panel end 90 may be precut to accommodate the base flanges 106, 108 of the U-shaped base member 100.

Shown at FIGS. 8A to 8D is an example embodiment of a corner panel 150 arranged with a panel 20. The first sheet 122 of the corner panel 150 can have a channel 25 and at least one ridge 26. The second sheet 142 of the corner panel 150 can have at least two portions 144 and 146, which are positioned generally at a corner angle alpha (α) to each other. It should be understood that the corner angle alpha may be about 90 degrees, or it may be some other desired angle.

The first sheet 122 may have a fastener portion 152 and a flange 154. For example, to assemble the fastener portion 152 and the adjacent panel 20, the sheet portion 152 may be positioned over the male edge ridge 37 of the panel 20. The flange 154 of the first sheet 122 may be positioned on the slope portion 36, adjacent to the ridge 37 of the panel 22, and the end portion 144 of the second sheet 142 is then slid over the edge portion 47 of the panel 22.

Figure 8A:
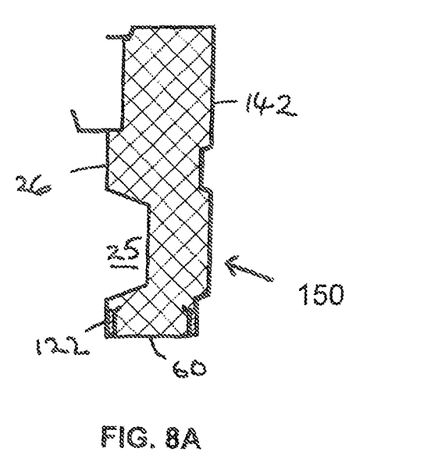
FIGS. 8A to 8F show example embodiments of a corner panel arranged with the building panel, in accordance with at least one embodiment.
Figure 8B:
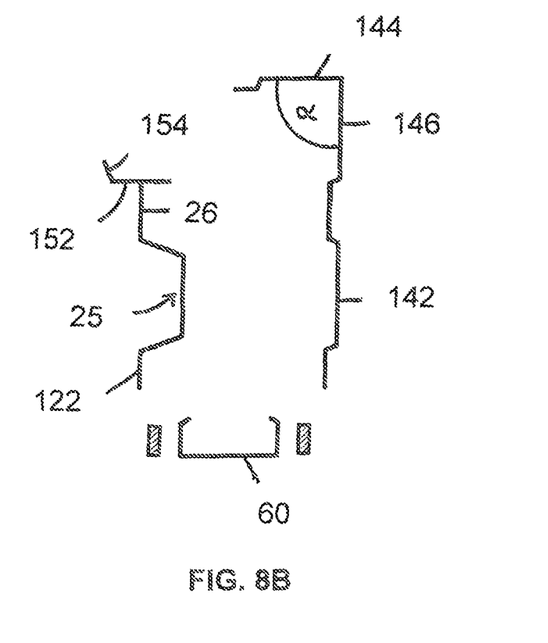
Figure 8C:
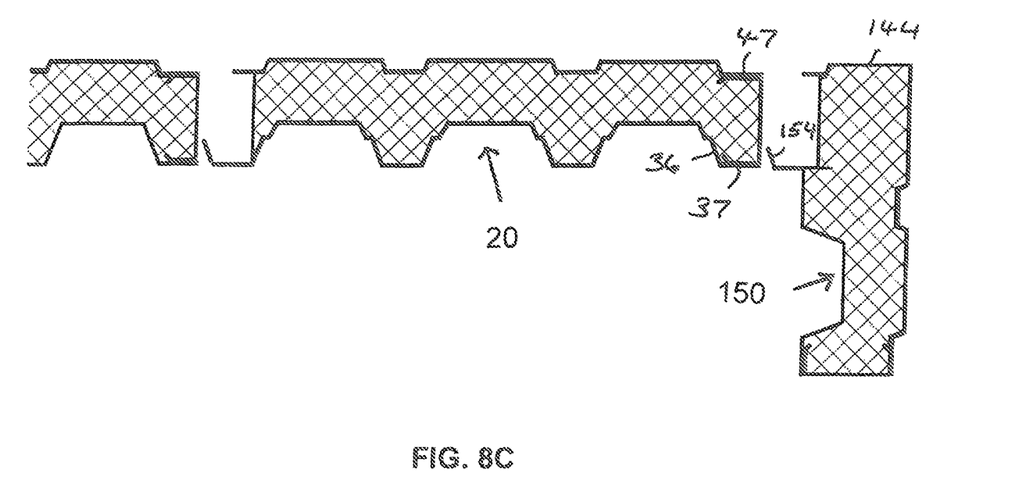
Figure 8D:
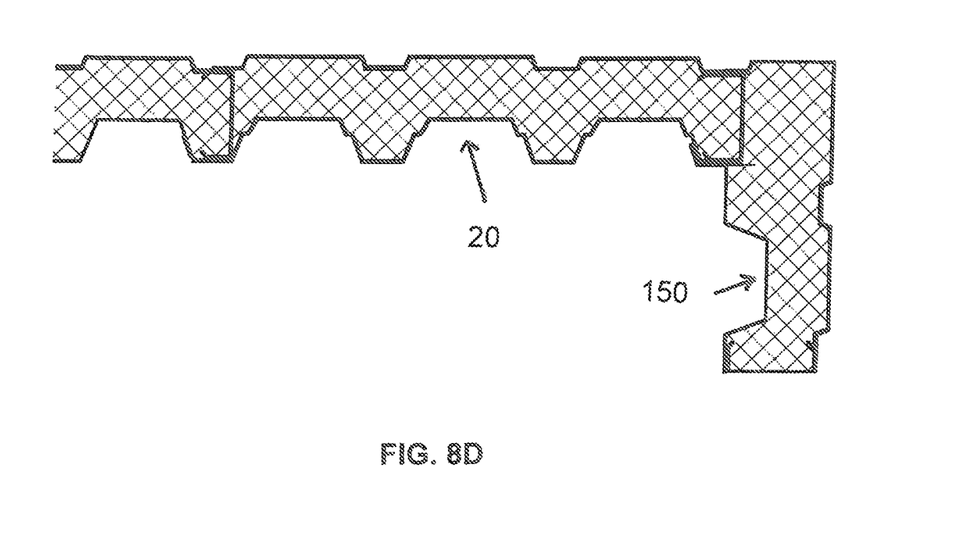
Figure 8E:
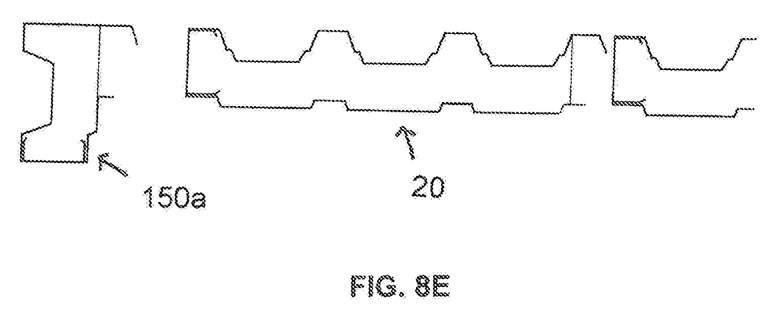
Figure 8F:
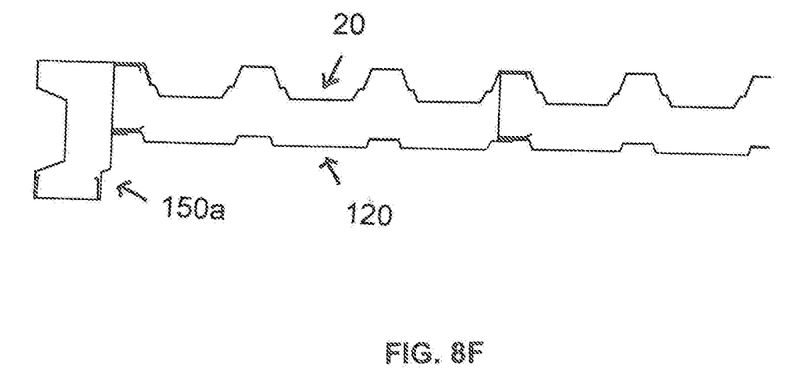

Shown at FIGS. 8E and 8F is an example embodiment of an alternative corner panel 150a arranged with a building panel 20. The corner panel 150F can be used to make external wall projections.

The corner panels 150 and 150*a* provide a convenient alternative to attaching the panels 20 of FIGS. 1-5 to form a corner by means of separate corner brackets (or angle irons).

The present building panel lends itself to a variety of manufacturing techniques, including role forming. Similarly, a variety of different materials can be used for the building panel. In some embodiments, the sheets are made of galvalume steel, and the insulating foam can be petroleum based or based on organic material (such as soya oil). The foam may comprise, for example, urethane, or other known insulating foam materials.

It will be appreciated by those skilled in the art that although the above alternative embodiments have been described in some detail many modifications may be practiced without departing from the claimed subject matter.

The invention claimed is:

1. A building panel comprising:
 a first sheet intended to provide an inner building surface, the first sheet being corrugated to define a plurality of generally parallel channels that extend along the length of the panel;
 a second sheet arranged generally parallel to the first sheet and intended to provide an outer building surface;
 the longer dimension of each of the first and second sheets defining the length of the panel, and the shorter dimension of each of the first and second sheets defining the width of the panel;
 an insulating foam core sandwiched between the first and second sheets extending substantially the entire length and width of the panel, such that the foam core occupies the entirety of the space defined by the first sheet and the second sheet, including the space defined by the second sheet and the corrugations of the first sheet;
 the panel also having edges defined by the surfaces of the foam core between the sheets running the length of the panel;
 the first and second sheets being in spaced apart relationship for substantially the entire length and width of the panel apart from along at least one edge of the panel; and
 a discreet load bearing rib separate from the first and second sheets, the rib extending along one edge of the panel and being connected to the first sheet and to the second sheet,
 wherein the channels each have side walls that define intermediate ledges extending inwardly at a depth to accommodate within the respective channel an electrical box of a first size and also have a bottom at a depth to accommodate within the respective channel an electrical box of a second size, said first size being different from said second size.

2. The building panel of claim 1, wherein the rib has two fastening portions for fastening the rib to each of the first and second sheets and a transverse portion that extends between the two fastening portions.

3. The building panel of claim 2, wherein the rib is generally C-shaped.

4. The building panel of claim 1, wherein the rib is fastened to each of the first and second sheets with insulating foam sheets therebetween to provide a thermal break.

5. The building panel of claim 1, wherein the first sheet is corrugated to define co-planar portions separated by a plurality of generally parallel channels that extend along the length of the panel, the channels being dimensioned so as to be able to accommodate electrical boxes or plumbing pipes.

6. The building panel of claim 5, wherein
 the depth of the intermediate ledges is about 1½ inches, and
 the depth of the channel bottom is about 2 inches.

7. The building panel of claim 6, wherein the second sheet is corrugated defining a plurality of mating channels that are dimensioned and spaced to align with and receive the co-planar portions of the first sheet so that a plurality of panels can be stacked in a partially nesting relationship.

8. The building panel of claim 1, further comprising mating left and right edges such that a plurality of abutting building panels can be inserted and locked together and the building panel is dimensioned such that a pair of building panels defines a nominal width of about 4 ft.

9. The building panel of claim 8, wherein the first and second sheets have a nominal width of about 2 ft.

10. The building panel of claim 8, wherein the first and second sheets are generally rectangular.

11. The building panel of claim 8, wherein at least one of the mating left and right edges is angled such that the building panel can be inserted and locked together with another building panel to form a corner.

12. A building panel system comprising a building panel according to claim 1, and further comprising a U-shaped base member to secure a plurality of abutting building panels to a base, the U-shaped base member having a pair of base flanges extending up from a connecting web, the U-shaped base member being dimensioned to fit within the building panel at an end thereof so that the base flanges are enclosed in proximity with the interior surfaces of the first and second sheets.

13. The building panel system of claim 12, wherein the ends of the building panel are pre-cut to provide a groove to accommodate the base flanges of the U-shaped base member.

14. The building panel of claim 5, wherein the channels are dimensioned to accommodate electrical boxes having a width of from about 1½ inches to about 2½ inches, and/or plumbing pipes having a diameter of from about ⅜ inches to about 1½ inches.

15. The building panel of claim 1, wherein at least one of the channels defines a depth of about 2 inches.

16. The building panel of claim 1, wherein at least one of the channels defines a depth of about 1½ inches.

* * * * *